W. SHATTUCK.
Bungs.
No. 147,800. Patented Feb. 24, 1874.
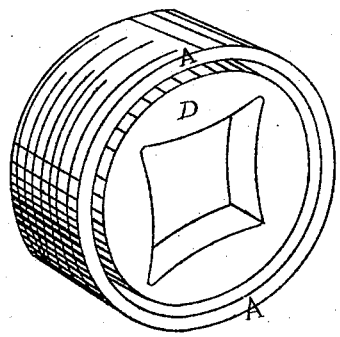
Fig. 1.
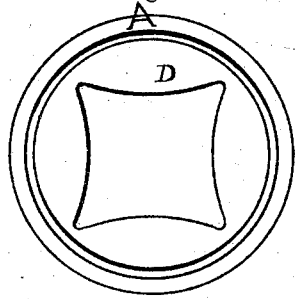
Fig. 2.
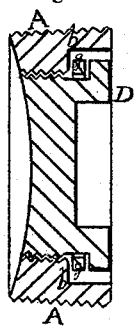 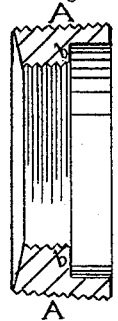 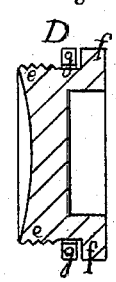
Fig. 3.    Fig. 4.    Fig. 5.
Witnesses
John L. Borne
C. M. Richardson
Wallace Shattuck
by Dewey & Co.
Att'ys

UNITED STATES PATENT OFFICE.

WALLACE SHATTUCK, OF SAN FRANCISCO, CALIFORNIA, ASSIGNOR TO GEORGE H. MIXER, OF SAME PLACE.

IMPROVEMENT IN BUNGS.

Specification forming part of Letters Patent No. 147,800, dated February 24, 1874; application filed December 6, 1873.

*To all whom it may concern:*

Be it known that I, WALLACE SHATTUCK, of San Francisco city and county, State of California, have invented an Improved Metal Bung and Bush; and I do hereby declare the following description and accompanying drawings are sufficient to enable any person skilled in the art or science to which it most nearly appertains to make and use my said invention or improvement without further invention or experiment.

My invention relates to an improved metal bung and bush for barrels and casks.

Referring to the drawing, Figures 1, 2, and 3 are views of the bush and bung; Fig. 4, a sectional view of the bush; and Fig. 5 a sectional view of the bung.

A is the metal bush or ring, which is provided with exterior screw-threads, so that it can be screwed into a suitable hole in the bung-stave of a barrel or cask in the usual way. This ring I cast with its upper half thinner than the lower half, so as to form a seat or offset, *b*, near its middle, inside the ring. The inner face of the lower or thicker half I provide with screw-threads, as shown. The plug D has its lower portion, *e*, made to fit the lower portion of the bush, being provided with screw-threads, so that it can be screwed into the threaded portion of the bush, while its upper portion, *f*, is made larger, in the manner of a flange, so as to form a projecting shoulder, which will fit down upon the seat or offset in the bush. This portion or flange *f* is made somewhat smaller in diameter than the upper inside portion of the bush, so that when the plug is screwed down into the bush an annular space of about the sixteenth of an inch will be left between them. A leather or other washer, *g*, is drawn over the threaded portion *e*, so as to fit against the under side of the projecting flange *f*, which forms the seat.

Thus, when the plug is screwed down, the leather washer will be compressed between the metal surfaces and provide a tight joint. A very large and steep screw-thread can be made on the lower portion of the metal bush, and a corresponding thread on the plug, so that only one or two turns of the plug will be required to firmly seat the flange *f* upon the offset *b*.

By the above-described construction of the flange *f*, so much smaller than the bush, I avoid the rusting together of the plug and bush. The seat or joint being midway between the upper and lower edges of the bush, the beer or other liquid which is contained in the barrel or cask will rise up through the threads until it is stopped by the seat, thus preventing this portion from rusting together, and by making the head or upper portion of the plug smaller than the diameter of the upper part of the bush, so as to leave a space between them, it will be impossible to rust the surfaces together.

This bung and bush can be very cheaply manufactured, and is preferred by brewers to the metal bungs heretofore used on account of its simplicity and freedom from rusting together.

Having thus described my invention, what I claim, and desire to secure by Letters Patent, is—

The flange or head *f* of the plug D, smaller than the diameter of the opening in the bush above the seat, so as to leave an annular space between the two, substantially as and for the purpose above described.

In witness whereof I hereunto set my hand and seal.

WALLACE SHATTUCK. [L. S.]

Witnesses:
JOHN L. BOONE,
C. MILTON RICHARDSON.